(12) United States Patent
Barre et al.

(10) Patent No.: US 9,003,717 B2
(45) Date of Patent: Apr. 14, 2015

(54) TROPICAL VENTILATION WELL

(71) Applicant: Centre Scientifique et Technique du Batiment, Champs sur Marne (FR)

(72) Inventors: Christian Barre, La Haye Fouassiere (FR); Jean-Paul Bouchet, Casson (FR); Philippe Delpech, Nantes (FR); Marc Dufresne de Virel, Nantes (FR); Gerard Grillaud, Orvault (FR); Olivier Flamand, Nantes (FR)

(73) Assignee: Centre Scientifique et Technique du Batiment (FR)

( * ) Notice: Subject to any disclaimer, the term of this patent is extended or adjusted under 35 U.S.C. 154(b) by 0 days.

(21) Appl. No.: 13/848,588

(22) Filed: Mar. 21, 2013

(65) Prior Publication Data

US 2013/0283708 A1   Oct. 31, 2013

(30) Foreign Application Priority Data

Apr. 30, 2012   (FR) ...................... 12 53989

(51) Int. Cl.
*F24F 7/02* (2006.01)
*E04H 9/14* (2006.01)
*F24F 7/00* (2006.01)

(52) U.S. Cl.
CPC .. *F24F 7/02* (2013.01); *E04H 9/14* (2013.01); *F24F 2007/001* (2013.01)

(58) Field of Classification Search
CPC ............ E04F 17/04; F24F 7/02; E04H 12/00; E04H 12/28; E04H 9/16; E04B 1/38; E04B 1/98; E04B 1/32; E04B 1/6806; E04B 5/48; E04B 7/00

USPC ......... 52/94, 95, 302.1, 302.3, 96, 90.1, 90.2, 52/91.1, 198–200, 219, 300–301, 40; 454/1, 3, 252, 354–356, 364–367
See application file for complete search history.

(56) References Cited

U.S. PATENT DOCUMENTS

| | | | | |
|---|---|---|---|---|
| 1,011,497 A * | 12/1911 | St. John | ................. | 454/251 |
| 1,078,983 A * | 11/1913 | Banzhaf | ................. | 454/1 |
| 1,218,360 A * | 3/1917 | Bell | ................. | 454/1 |
| 1,484,328 A * | 2/1924 | Heimbach | ................. | 454/1 |
| 1,706,496 A | 3/1929 | Pieri | | |
| 1,706,893 A * | 3/1929 | Leighton | ................. | 454/1 |
| 3,425,178 A * | 2/1969 | Kinkead et al. | ................. | 52/244 |
| 3,921,509 A * | 11/1975 | Curry et al. | ................. | 454/35 |
| 4,144,802 A * | 3/1979 | Babin | ................. | 454/353 |
| 4,616,457 A * | 10/1986 | Yoder et al. | ................. | 52/218 |
| 4,688,473 A * | 8/1987 | Eriksson | ................. | 454/3 |

(Continued)

FOREIGN PATENT DOCUMENTS

DE   937199 C1   12/1955
FR   2296073 A1   7/1976

(Continued)

*Primary Examiner* — Beth Stephan
(74) *Attorney, Agent, or Firm* — Amster, Rothstein, Ebenstein LLP

(57) ABSTRACT

The invention relates to a ventilation well with hurricane-resistant function for a building comprising an inclined roof (11), intended to be adapted to said building in such a way as to extend over its entire height, communicating towards the exterior of the building at the peak of the roof, and having at least one lateral opening (3, 4) communicating with the inside volume of the building, characterized in that it further comprises a cap (5) which may be adjustable in height and/or removable at the top of the well.

17 Claims, 1 Drawing Sheet

(56) References Cited

U.S. PATENT DOCUMENTS

| | | | | |
|---|---|---|---|---|
| 4,697,500 A | * | 10/1987 | Hisey | 454/35 |
| 5,025,712 A | * | 6/1991 | Perry | 454/35 |
| 5,481,837 A | | 1/1996 | Minks, Jr. | |
| 5,566,515 A | | 10/1996 | Curry | |
| 5,826,379 A | | 10/1998 | Curry | |
| 6,401,403 B1 | | 6/2002 | Oviedo-Reyes | |
| 6,484,459 B1 | | 11/2002 | Platts | |
| 6,550,189 B2 | | 4/2003 | Shelton | |
| 6,997,798 B2 | * | 2/2006 | Jensen | 454/4 |
| 7,690,159 B1 | | 4/2010 | Arnold | |
| 2008/0196348 A1 | | 8/2008 | Woodcock | |
| 2009/0205264 A1 | | 8/2009 | Fisher et al. | |

FOREIGN PATENT DOCUMENTS

| | | | | |
|---|---|---|---|---|
| FR | 2776318 A1 | | 9/1999 | |
| FR | 2776324 A1 | | 9/1999 | |
| FR | 2834047 A1 | * | 6/2003 | F23L 17/02 |
| WO | 2011005464 A2 | | 1/2011 | |
| WO | 2011072374 A1 | | 6/2011 | |

* cited by examiner

TROPICAL VENTILATION WELL

RELATED APPLICATION

The present invention claims priority to French Patent Application 125389, filed Apr. 30, 2012, entitled "Cheminée tropicale, à savoir puits de ventilation avec function anticyclonique, construction et kit associés", the full disclose of which is incorporated herein by reference in its entirety

TECHNICAL FIELD OF THE INVENTION

The invention relates to the field of buildings, and more particularly inhabitable buildings intended to be located in regions where very strong winds of the hurricane type can blow.

The existence in the tropical regions of relatively frequent hurricanes raises the problem of the resistance to wind of the structures and in particular of dwellings. Furthermore, in these regions, the tropical climate encourages the design of dwellings that favour natural ventilation principles.

Usually, dwellings rest on a slab and include walls, a framework bearing a roof generally constituted of several inclined slopes. The wind induced on the exterior walls of the dwelling cause high-pressure zones and other zones with low pressure which can lead to the roof and walls being pulled off.

BACKGROUND OF THE INVENTION

In this field, FR 2 776 324 B1 discloses a well which comprises openings that communicate with the inside of a building.

However, the well proposed is not entirely satisfactory in terms of the ventilation of the dwelling. Furthermore during rain, water can accumulate inside the well and this is a problem. The management of this rainwater is not explained in this document.

SUMMARY OF THE INVENTION

The invention aims to overcome the disadvantages of prior art and in particular to propose an improved system.

To do this, a ventilation well is proposed with a hurricane-resistant function for a building comprising an inclined roof, intended to be adapted to said building in such a way as to extend over its entire height, communicating towards the exterior of the building at the peak of the roof, and having at least one lateral opening communicating with the inside volume of the building.

According to a first aspect of the invention, the well further comprises a cap which may be adjustable in height at the top of the well. As such, infiltrations of water into the dwelling are avoided.

According to an interesting alternative, the cap has a shape chosen from among a truncated cone, cone, truncated pyramid, pyramid.

By way of example, the cap is made from wood, metal, glass, composite materials or a combination of the latter, more preferably in the form of panels on a metal frame.

According to a preferred alternative, the well comprises at least one upper lateral opening close to the roof and at least one lower lateral opening, and two external and internal concentric channels which communicate respectively with one or the other among said at least one upper lateral opening and said at least one lower lateral opening.

More preferably, the external concentric channel communicates with said at least one upper lateral opening and the internal concentric channel communicates with said at least one lower lateral opening.

According to a preferred embodiment, the well is made of metal, composite materials and/or fibre-reinforced concrete.

Advantageously, the well comprises foundation elements that extend around the base of the well.

According to an interesting aspect, the well comprises network elements required for the dwelling.

The invention further relates to a building comprising at least one well such as previously described.

Another object of the invention relates to a kit comprising prefabricated elements constituting the well such as previously described.

BRIEF DESCRIPTION OF THE DRAWINGS

Other characteristics, details and advantages of the invention shall appear when reading the following description, in reference to the annexed figures, which show.

More increased clarity, identical or similar elements are marked with identical reference signs across all of the figures.

DETAILED DESCRIPTION OF A PREFERRED EMBODIMENT

Patent FR 2 776 324 B1 describes many aspects linked to hurricane-resistant wells other than those for which details are provided hereinbelow.

Figure 1:
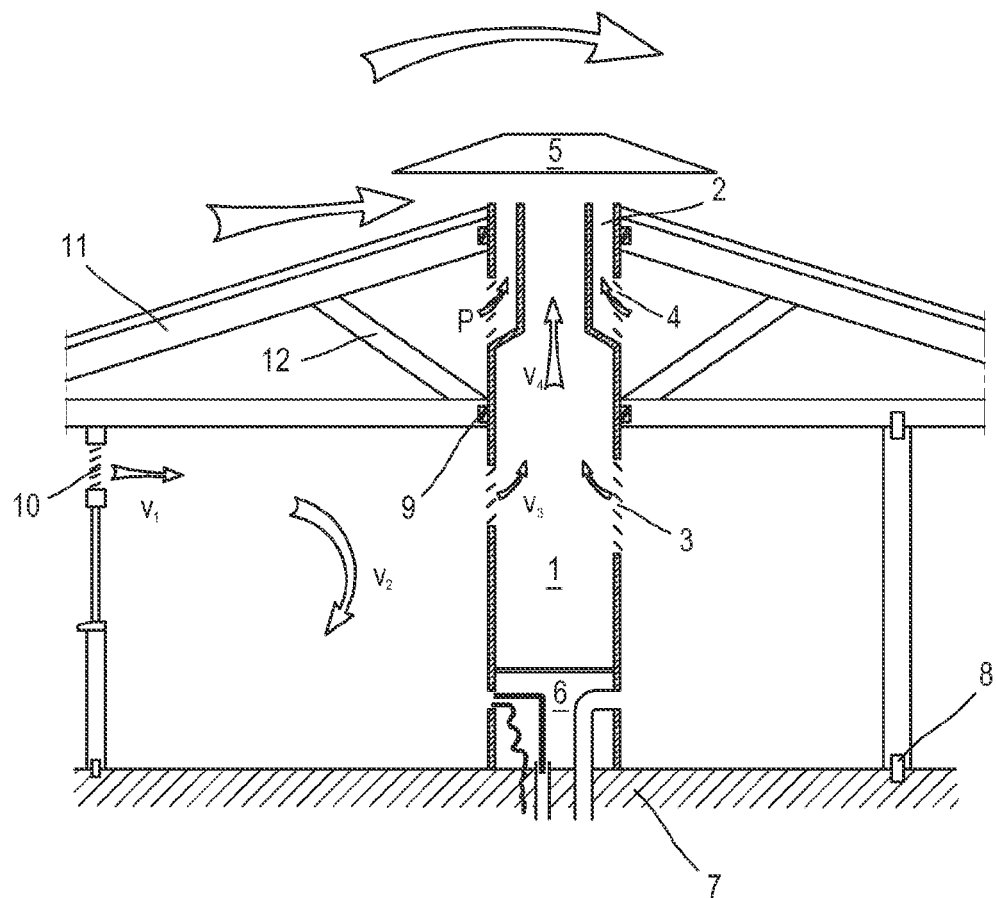
FIG. 1, a cross-section view of a building comprising a well according to a preferred alternative of the invention.

As can be seen in FIG. 1, the invention consists of a constructive element of the "central well" type, allowing the future building, build around this element, to resist hurricane events and the associated strong winds. It further makes it possible, and outside of hurricane alert periods, to provide the dwelling with a natural ventilation, which may be adjustable, in order to provide optimum comfort for the occupants.

This central element is comprised of a main vertical duct 1 with a substantial section (of a magnitude of 1 to 2 m²) through which circulations of air can be provided between the various rooms of the dwelling and the exterior (on the roofing) for the purposes of natural ventilation. One or more secondary ducts 2 make it possible to balance the pressure differentials that are exerted on the internal and external surfaces of the roofing in a situation of strong wind in order to prevent the pulling off of roofing elements and ruining the edifice (operation in the event of a hurricane alert).

The future building is built around the well whereon, by means of suitable fastening, can be interfaced the various constructive elements of which the roofing elements and the interior partition walls.

This well constituted of prefabricated elements, rests on a block and foundation elements 7 that can extend around the well in order to provide the anchoring points to the ground of the interior or exterior wall elements of the future building. The foundation is dimensioned in order to provide support for the efforts that are exerted on the well, via the supported wall and roofing elements.

As can be seen in FIG. 1, means of anchoring 8 for constructive elements linked to the foundation are provided, as well as means for anchoring 9 for constructive elements linked to the well, of which the roofing. By way of example, post supports are fixed to the foundation elements and plates or shoes for the framework elements are incorporated into the well.

Of course, the sets of openings 10 can be provided on the walls of the building in order to contribute to a better natural ventilation, and as such to the comfort of the inhabitants.

The well can in particular be constituted of two channels 1, 2 which may be concentric and independent. If the global section of the well (exercising ventilation and balancing functions) is about 1 to 2 m², it is preferable that the section of the balancing duct be of a magnitude of 10% of the global section of the well. These two channels make it possible to treat in a separate manner the aeraulic needs for the natural ventilation (v1 to v4) and the balancing function of pressure P in the event of a hurricane alert. The well is as such provided with different permeabilities 3, 4 of the "opening with or without louvers" type, coming onto the various surfaces of the well and at different heights. This makes it possible to produce the circulations of air sought in the various ducts. The ventilation duct 1 allows for aeraulic exchanges between the exterior (roofing zone) and the rooms of the building (whereon permeabilities to the air are also arranged). The "hurricane balancing" duct 2 solicited solely in the event of a hurricane alert, makes it possible to balance the pressures between the attic area (under-roofing) and the upper surface of the roofing located in the vicinity of the output section of the well. Under normal conditions, this duct provides a minimum of ventilation of the attic area in order to prevent an excessive accumulation of heat.

At the top of the well, a cap 5 provides an effective protection of the open section with regards to the rain (abundant in the case of a hurricane event). The geometry of the cap and its location in relation to the roofing makes it possible to generate, via the venturi effect, the "drawing" required for a good dynamics of natural ventilation in the various rooms of the dwelling.

Figure 2:
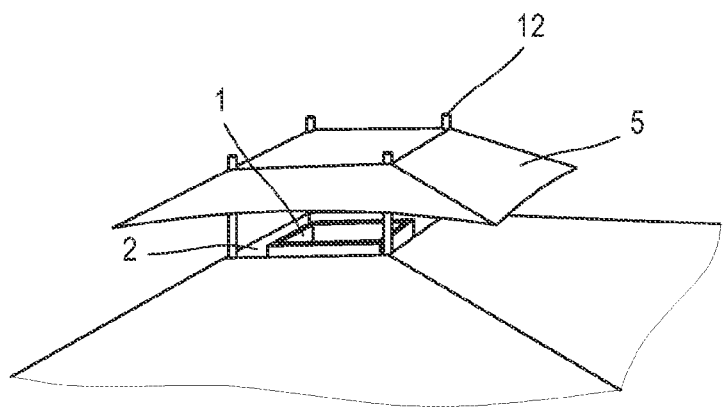
FIG. 2, a view in the space of the roof and of the cap of the building of FIG. 1.

In normal operation, outside of hurricane alert periods, the position of the cap can be adjusted (in particular with regards to its height in relation to the roofing) by an adapted mechanical adjusting system in order to optimise the natural ventilation and the comfort felt according to the conditions of exterior wind. By way of example, the adjusting of the height is provided by a rack system and is guided by a set of rods 12 shown in FIG. 2

In conditions of very low or zero exterior wind and of excessive heat, the cap itself is able to store via the radiative effect the solar heat on its lower surface (and on the neighbouring internal walls of the ventilation duct of the well) in order to provide, via a local convective effect on the output of the well, a putting into movement of the air supplying a minimum of ventilation in the well and therefore in the dwelling.

The invention is usefully supplemented by the possibility of receiving at the base of the well the various networks 6 required for the dwelling. In this sense, the bases of a first sanitation network and fluid arrival (water, electricity) can be incorporated into the well. The central position of the well is a certain advantage for an easy distribution of these networks in the dwelling.

The invention can be used as several independent copies in the same dwelling according to the liveable surface sought. In this perspective, a design via assembling independent modules built around each of the wells shall be favoured.

A design of the well with prefabricated elements made from fibre-reinforced concrete and metal (for the reinforcements and the openings in particular) is preferred. The cap is more preferably carried out on the base of a metal frame receiving panels that can be made of wood, metal, glass and/or composite materials.

Many combinations can be considered without leaving the scope of the invention; those skilled in the art will choose one or the other according to the economic, ergonomic, dimensional or other constraints that must be complied with.

The invention claimed is:

1. A ventilation well in combination with a building, the ventilation well for providing the building with hurricane resistance, the building comprising an inclined roof and a height, the ventilation well having a height, an upper portion adjacent to the roof and a lower portion spaced from the roof, the height of the building equal to the height of the well such that the well extends over the entire height of the building, the ventilation well comprising:
    an internal channel having at least one lower lateral opening located in the lower portion of the well and an internal top opening adjacent the roof communicating with an exterior of the building, and an upper external channel having at least one upper lateral opening located in the upper portion of the well and an external top opening adjacent the roof communicating with the exterior of the building, each of the at least one upper lateral opening and the at least one lower lateral opening communicating with an inside volume of the building;
    the channels are vertically extending and concentric, the internal channel extending the height of the well and the external channel extending only over the upper portion of the well; and
    a cap, adjustable in height, at a top of the ventilation well.

2. The combination according to claim 1, wherein the cap has a shape of a truncated cone, cone, truncated pyramid or pyramid.

3. The combination according to claim 1, wherein the cap is made from wood, metal, glass, composite materials or a combination thereof.

4. The combination according to claim 1, wherein the well is made of metal, composite materials, fibre-reinforced concrete or a combination thereof.

5. The combination according to claim 1, wherein the ventilation well comprises foundation elements that extend around a base of the well.

6. The combination according to claim 1, wherein the well comprises network elements required for the building.

7. A kit comprising prefabricated elements for assembly of the ventilation well according to claim 1.

8. The combination according to claim 1, wherein the cap is removable.

9. The combination according to claim 1, wherein the cap is made from a material in the form of panels on a metal frame.

10. A ventilation well for use with a building having a roof for providing hurricane resistance, the well comprising:
    a vertically extending central element having an outer wall, a height, a top portion and a bottom portion;
    an internal channel having at least one lower lateral opening located in the bottom portion of the central element and an internal top opening located at a top of the well for communicating with an exterior of the building at the roof, and an external channel having at least one upper lateral opening located in the top portion of the central element and an external top opening located at the top of the well for communication with the exterior of the building at the roof, each lateral opening extending through the outer wall of the central element for communication with an internal volume of the building;

the channels are each vertically extending and concentric, the internal channel extending the height of the central element and the external channel extending only along the top portion of the central element; and a removable cap at the top of the ventilation well.

11. The ventilation well according to claim 10, wherein the cap has a shape of a truncated cone, cone, truncated pyramid or pyramid.

12. The ventilation well according to claim 10, wherein the cap is made from wood, metal, glass, composite materials or a combination thereof.

13. The ventilation well according to claim 10, wherein the cap is made from a material in the form of panels on a metal frame.

14. The ventilation well according to claim 10, wherein the well is made of metal, composite materials, fibre-reinforced concrete or a combination thereof.

15. The ventilation well according to claim 10, wherein the ventilation well comprises foundation elements that extend around a base of the well.

16. The ventilation well according to claim 10, wherein the well comprises network elements required for a building.

17. A building comprising at least one ventilation well according to claim 10.

* * * * *